United States Patent [19]

Clement

[11] 4,131,935

[45] Dec. 26, 1978

[54] TERMINAL-COVER ASSEMBLY HAVING COINED REGION OF REDUCED CROSS SECTION COMPRESSING RESILIENT BUSHING

[75] Inventor: Warren J. Clement, Williamstown, Mass.

[73] Assignee: Sprague Electric Company, North Adams, Mass.

[21] Appl. No.: 783,376

[22] Filed: Mar. 31, 1977

Related U.S. Application Data

[63] Continuation of Ser. No. 556,248, Mar. 7, 1975, abandoned.

[51] Int. Cl.² ............................................. H01G 9/00
[52] U.S. Cl. ................................... 361/433; 174/52.5
[58] Field of Search ........................ 361/433; 174/52.5

[56] References Cited

U.S. PATENT DOCUMENTS

| | | | |
|---|---|---|---|
| 2,443,545 | 6/1948 | Schwennesen | 361/433 |
| 3,341,751 | 9/1967 | Clement | 361/433 |
| 3,555,370 | 1/1971 | Bowling | 361/433 |
| 3,812,039 | 5/1974 | Niwa | 361/433 |
| 3,859,574 | 1/1975 | Brazier | 361/433 |

FOREIGN PATENT DOCUMENTS 1155659  6/1969  United Kingdom ................... 361/433

Primary Examiner—Joseph E. Clawson, Jr.
Attorney, Agent, or Firm—Connolly and Hutz

[57] ABSTRACT

A metal cover has a hole into which an insulating resilient T.F.E. bushing is force fitted. A metal terminal is pushed into the hole in the bushing. These three parts are essentially coaxial and form a cover-terminal assembly that is subsequently placed between and compressed by a pair of coining dies to deform the cover metal adjacent to the periphery of the cover hole. This coining step forces metal tightly against and into the resilient bushing subsequently compressing the bushing about the terminal. This terminal-cover assembly is particularly suitable for closing the housing of a hermetically sealed electrolytic capacitor. It is inert to chemically active electrolytes and withstands high internal pressures that are often associated with such capacitors.

8 Claims, 9 Drawing Figures

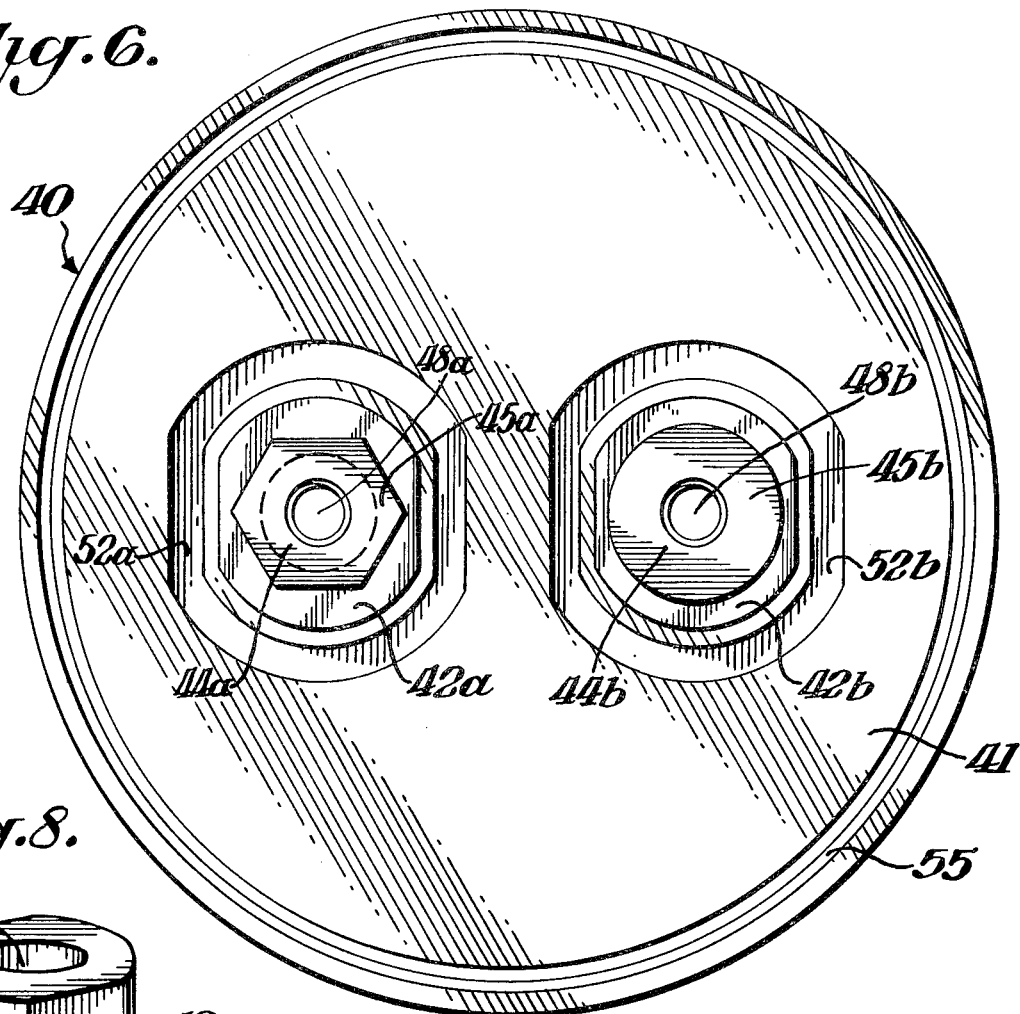
Fig. 6.
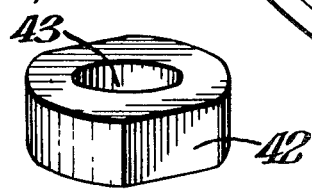
Fig. 8.
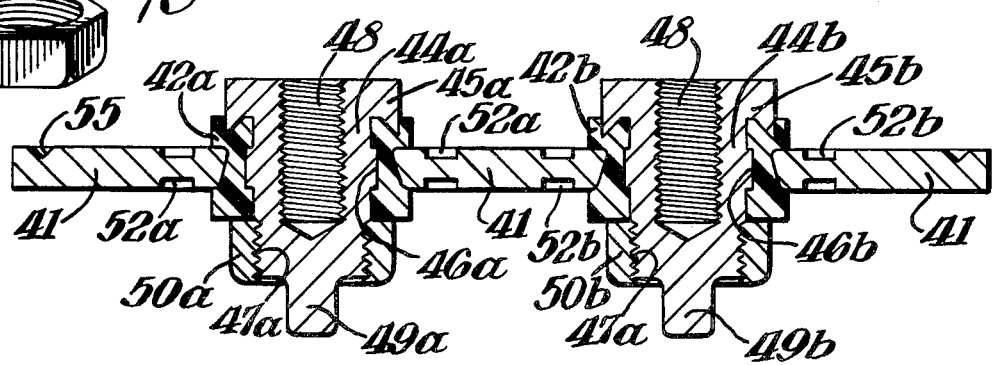
Fig. 9.
Fig. 7.

TERMINAL-COVER ASSEMBLY HAVING COINED REGION OF REDUCED CROSS SECTION COMPRESSING RESILIENT BUSHING

CROSS REFERENCE TO RELATED APPLICATION

This application is a continuation of application Ser. No. 556,248 filed Mar. 7, 1975, now abandoned.

BACKGROUND OF THE INVENTION

This invention relates to a terminal-cover assembly for use in a sealed electrical component package and more particularly to a metal cover having an insulated through terminal mounted therein for use in a hermetically sealed electrolytic capacitor package.

Although many terminal-cover assemblies are known for use in hermetically sealed electrolytic capacitor packages, most of them, and particularly the multi-terminal type, employ a phenolic, plastic or otherwise non-metal cover material. Metal covers are more readily sealed to a metal can by reliable sealing means such as tungsten inert gas welding, ultrsonic welding, brazing and the like. Metal covers and cans are stronger and usually less bulky for withstanding physical stresses of handling, mounting or internal pressures often generated by operating electrolytic capacitors contained therein. Metal cans are often preferable for serving as a cathode electrode in electrolytic capacitor packages. Capacitor anodes of aluminum are preferably packaged in aluminum cans which are compatible to and inert to the electrolyte solution being employed.

The stronger metal covers also are more readily adapted for making both the electrical and mechanical connection between the package and the package environment.

It is common practice in terminal-metal-cover assemblies to employ a glass insulating bushing about the terminals, representing an efficient but comparatively expensive assembly. It is also known to force fit a resilient bushing into an extruded and funneled opening in a metal cover, the terminal being compressed thereby in a center hole of the compressed bushing.

It is an object of the present invention to provide a terminal-cover assembly having a strong insulating bushing containing a metal terminal, the bushing being highly compressed within a hole in a metal cover.

It is a further object of this invention to provide a terminal-cover assembly for use in a hermetically sealed electrolytic capacitor package that is chemically inert to strong electrolytes, capable of withstanding large internal pressures without leaking electrolyte.

It is a further object of this invention to provide a method for making a low cost terminal-metal-cover assembly for use in a hermetically sealed electrolytic capacitor package.

SUMMARY OF THE INVENTION

A metal cover has a hole into which an insulating resilient bushing is fitted. A metal terminal is fitted in a hole in the bushing. These three parts form a terminal-cover assembly that is subsequently placed between and compressed by a pair of dies to deform the cover metal in a region adjacent to and surrounding the bushing. This coining step causes the metal periphery of the cover hole to move inward into the bushing. The bushing is thereby compressed between the terminal and the cover plate forming hermetic seals therebetween.

The terminal preferably has surface irregularities such as ridges, grooves, corrugations or knurls in the region of the terminal to bushing seal, thus enhancing the physical strength and integrity of the seal. Also, when the terminal is adapted for making threaded connection to external wiring busses, as by having a threaded hole or a threaded stud at one end, then it is preferred that the cover hole have at least one flat therein so as to prevent rotational movement between the cover and the bushing when applying torque therebetween.

The preferred bushing material is tetrafluoroethylene (T.F.E.), e.g. TEFLON, a trademark of E. I. duPont de Nemours & Co., Wilmington, Delaware. It is strong, capable of high temperature operation and essentially inert to the highly effective but chemically active capacitor electrolytes such as dimethylformamide. However, for some applications other suitable bushing materials include other fluorocarbon plastics, polyethyleneterephathalate, butyl rubber and the like.

The preferred cover metal is the standard grade 1100 aluminum, designating an alloy of at least 99% aluminum content. The material is started soft, usually between fully annealed and half hard. When it is coined it is strain hardened. This aluminum is readily coined and punched, and is among the least corrodible aluminum alloys. Other cover materials are suitable, however, particularly high aluminum content alloys of any temper. Some malleable steels may be suitable in some cases, especially when clad or plated with a less corrosive metal.

Although the terminal-cover assembly of this invention is particularly advantageous in a hermetically sealed electrolytic capacitor package, other hermetically sealed electrical components including other capacitor types, resistors, inductors, transformers, and the like, requiring protection from moisture or other atmospheric contaminants may advantageously employ this novel assembly.

BRIEF DESCRIPTION OF THE DRAWING

FIG. 6 shows a top view essentially to scale of a second preferred embodiment of a terminal-cover of this invention.

FIG. 7 shows a side sectional view essentially to scale of the terminal-cover assembly of FIG. 6.

FIG. 8 shows a perspective view of a resilient bushing for use in the assembly of FIGS. 6 and 7.

FIG. 9 shows a perspective view of a nut for use in the assembly of FIGS. 6 and 7.

DESCRIPTION OF THE PREFERRED EMBODIMENTS

Figure 1:
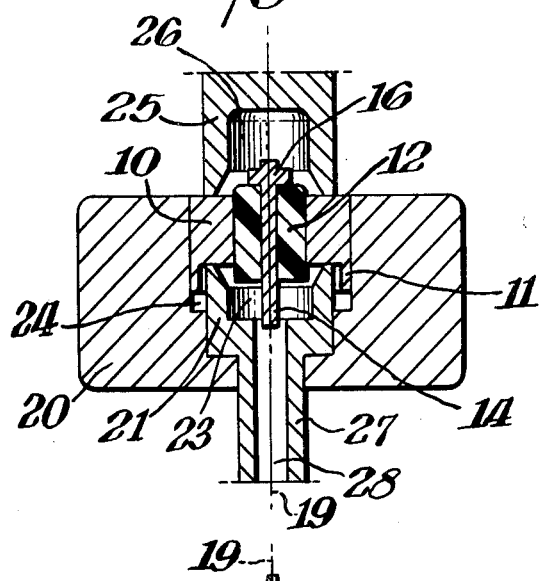
FIG. 1 shows a side sectional view of a terminal-cover assembly, representing a first preferred embodiment of this invention, being positioned in a coining tool.
Figure 2:
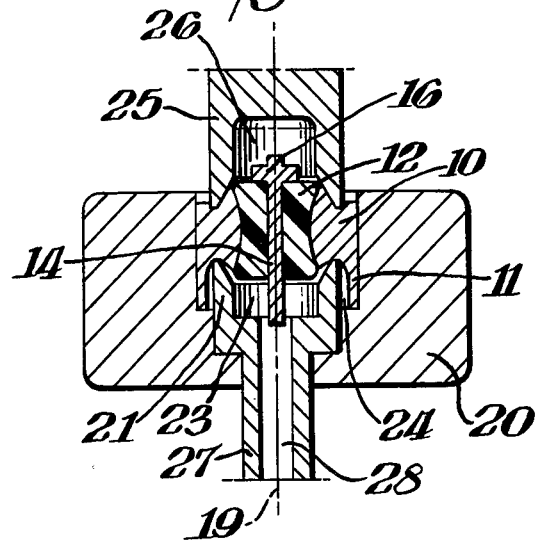
FIG. 2 shows the terminal-cover assembly of FIG. 1 in the process of being coined.

A terminal-cover assembly according to a first preferred embodiment of this invention is formed as shown and illustrated in FIGS. 1 and 2. A metal cover member 10 has an essentially cylindrical geometry and has a rim 11 extending in an axial direction from the outer periphery. A round hole is centered within the cover 10 in which a resilient bushing 12 is shown fitted in FIG. 1. The cylindrical bushing 12 has a hole coaxially positioned therein and a metal wire terminal 14 is located in the bushing hole. These mating parts, namely terminal 14, busing 12 and cover 10 are provided with interference fits relative to each other and are assembled and mounted as shown in FIG. 1 in a steel tool comprising a block 20, and two opposing dies 21 and 25. The opposing dies 21 and 25 are designed to make contact with the metal cover 10 in a region adjacent to and surrounding the bushing 12. Thus the terminal-cover assembly and the coining tool are coaxial about axis 19.

Referring specifically to FIG. 2, the top die 25 is forced downward toward opposing die 21 with sufficient pressure to distort the cover metal, causing the cover metal to move into and to distort and compress the resilient bushing 12. The compressed bushing is consequently sealed tightly to the cover 10 and to the terminal 14.

The dies 21 and 25 have cavities 23 and 26, respectively, to freely receive end portions of the bushing 12 and terminal 14 without interference during the pressing step. The lower die 21 also has a tubular portion 27 with cavity 28 that accommodates an extended length of the terminal 14 without interference. The cavity 28 may alternatively have a slide fit with the extended length of the terminal 14 for the purpose of holding the terminal centered during pressing. This may prevent tipping or lateral movement of the terminal in the event that the two dies are not precisely coaxially aligned or in case other asymmetry in the tool pieces or the cover tend to cause differential lateral forces to the terminal. An even more conservative anti-tipping method further includes providing a tubular hole in the top die 25 to guide an extended top length of terminal 14 (not shown).

The cover 10 has a slide fit within cavity 24 of block 20 so that during the pressing step, the block prevents outward displacement of the cover metal. The cavity 24 is deep enough that the rim portion 11 of the cover 10 is not distorted during pressing. The inside chamfer leading away from the working faces of the die also tends to direct the cold flowed cover metal inwardly against the bushing.

After the pressing step, the upper die 25 is retracted and the lower die 21 is elevated relative to block 20 to knock out the terminal-cover assembly.

Figure 3:
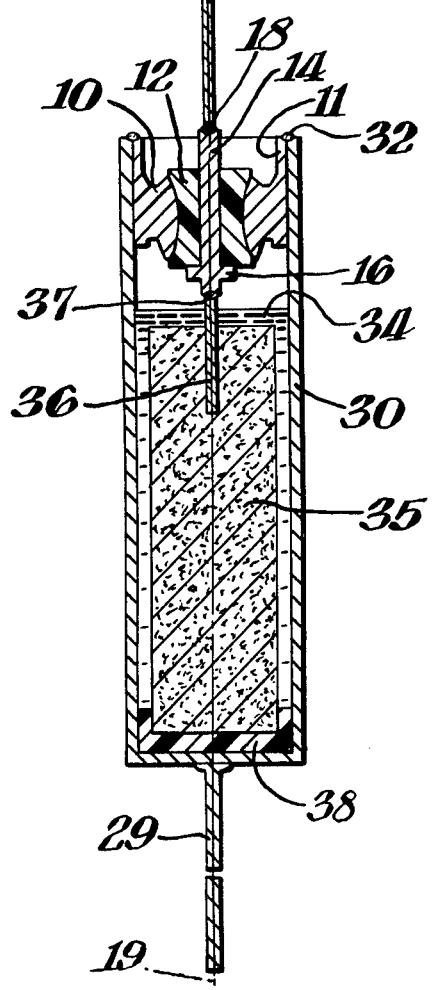
FIG. 3 shows the coined and completed terminal-cover assembly of FIG. 2, being mounted in a can containing an electrolytic capacitor.

The terminal-cover assembly made as described above is shown sealed in the mouth of a ⅝ inch diameter tubular aluminum can 30 in FIG. 3. A weld beam 32, preferably made by a tungsten inert gas or laser weld process, joins and seals the cover rim 11 all around the outer periphery of the mouth of the can 30.

The can contains a liquid electrolyte 34 and an electrolytic capacitor section 35 having an anode lead wire 36 attached to the inside headed end 16 of the terminal 14 by a weld 37. An insulating spacer 38 provides physical support to the capacitor section 35 within the bottom of the can 30. An axial cathode terminal wire 29 is attached to the outer bottom of the can 30. The capacitor assembly steps include forming the terminal-cover assembly as illustrated in FIGS. 1 and 2, welding the capacitor anode wire to the terminal 14, placing spacer 38 in the cam, dispensing electrolyte in the can, inserting the capacitor section in the can and sealing the terminal-cover assembly in the mouth of the can, and welding the cover to the can. The electrolytic capacitor is thus completely hermetically sealed within the can.

Figures 4, 5:
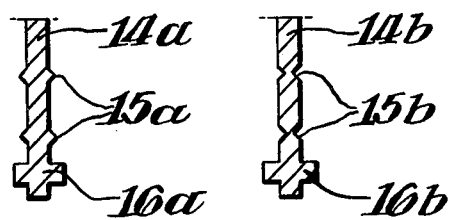
FIG. 4 shows an alternate terminal for use in the terminal-cover assembly of FIG. 2.
FIG. 5 shows a second alternate terminal for use in the terminal-cover assembly of FIG. 2.

Alternative terminal structures 14a and 14b are shown in FIGS. 4 and 5 having surface irregularities 15a and 15b, respectively, in the region of the bushing to terminal seal. Such irregularities enhance the effectiveness of the seal and provide greater strength in the axial direction insuring that internal pressures generated within the can do not disturb and weaken the bushing to terminal seal. Terminal head 16 also helps prevent outward movement of the terminal 14 in an axial direction when high internal pressures are generated within the can. Although not shown, it is common to provide a pressure vent somewhere in the wall of the capacitor housing that relieves the pressure before it becomes dangerously high. An external anode lead wire 17 may be butt welded 18 to the terminal 14.

In a second preferred embodiment illustrated in FIGS. 6 and 7, a circlar aluminum cover plate 41 of about 2½ inches in diameter has two holes each of which is round except for having two opposing flats therein. A bushing 42 of tetrafluoroethylene (T.F.E.) shown in perspective view in FIG. 8 has an outer periphery of the same geometry as the flatted cover holes. Two such resilient insulating bushings 42a and 42b are pressed into the cover holes, having an interference fit therein. Two aluminum terminals 44a and 44b are pressed into the circular bushing holes 43 of the two bushings 42a and 42b, respectively. The two terminals have a generally cylindrical geometry and a headed end portion 45 having a greater average diameter than the remainder of the terminal body. Terminal head 45a is hex-shaped while terminal head 45b is circular as can be seen in FIG. 6, illustrating alternative terminal designs. Otherwise the two terminals 44a and 44b are alike. Although two sealed terminals are illustrated in the terminal-cover assembly 40, this invention is intended to encompass metal cover assemblies having any larger number of such terminals sealed therein.

The terminal heads 45 are undercut so as to form a sharp barb-shaped rim. Also the outer central body portion of the terminal has a raised surface portion 46 that is preferably knurled. The lower part, as shown in FIG. 7, of the terminal 44 has an outer threaded portion 47 while the upper part of the terminal has a threaded hole 48 therein, which hole does not extend through the terminal.

A hex nut 50, as shown in FIG. 9, is threaded onto the outer threads 47 of the terminal and tightenned to about 40 inch-pounds causing the sharp rim of the head to distort and press part way into the resilient bushing 42. The terminal-cover assembly 40 is then placed between two opposing coining dies, similar to dies 21 and 25 as shown in FIG. 1, and a pressure of about 30 to 35 tons per square inch is applied to the peripheral regions 52 of the cover 41 adjacent to the terminal bushing 42, distorting the cover and diminishing the circumference and diameter of the cover holes. The bushing 42 is thus compressed and tightly locked and sealed against the terminals 44 as shown in FIG. 7 while another tight hermetic seal is simultaneously effected between the cover 41 and the bushing 42.

An extension 49, as seen in FIG. 7, projects from the lower end of the terminals 44, each being adapted for a weld connection to a lead of an electrical component. The threaded hole 48 is adapted to receive a threaded bolt for connecting an electrical lug (not shown) to the terminal 44. During the tightening of such a connecting bolt (not shown), a torque is applied between the terminal 44 and the cover plate 41. It can now be appreciated that the flatted cover holes and the knurled body of the terminals provide a locking seal between the bushing and each of the cover and the terminal, so that rotation of these parts relative to each other is prevented and the integrity of the seal is maintained.

An additional restraint against rotational movement between the bushing and the terminal is provided by the hex-shaped head of terminal 44a. Here, the sharp rim of the head is interrupted in six places corresponding to the flat sides of the hex nut. Thus in effect six separated barbs penetrate the bushing adding additional resistance to rotation during the tightening of a bolt in the threaded hole 48.

A "V" groove 55 in the cover 41 may be provided to enhance a seal of the cover in the mouth of a cam. A variety of suitable can to cover seals other than welds are well known, the method taught by Puppolo et al in U.S. Pat. 3,822,397 being one of these.

In the above described process for coining the cover plate 41, the two dies were provided with surfaces that mate with the broad essentially undistorted surfaces of the cover plate. This provides a means of stopping the closing motion of the two dies so as to control the depth of the coined peripheral regions 52 and therefore the distortion of the cover metal about the bushing. Other conventional stopping means are practical such as blocking the die in regions remote from the work piece or blocking the arbor press in which the coining tools are mounted.

What is claimed is:

1. A terminal-cover assembly for an electrical component package comprising a generally planar surface metal cover member having a hole therein, an insulating bushing of resilient material being mounted in said cover hole, said bushing having a hole therein, a metal terminal being mounted in said bushing hole, the planar surface of said cover member having a coined region of reduced cross section spaced laterally from and surrounding said bushing, and cold-flowed material of said cover member between said coined region and said bushing compressing said bushing so as to form a first seal between said cover and said bushing and a second seal between said terminal and said bushing.

2. The terminal-cover assembly of claim 1 wherein said metal terminal has surface irregularities in the region of said second hermetic seal.

3. The terminal-cover assembly of claim 1 wherein said cover hole is circular, and said bushing is essentially cylindrical and, said bushing hole being positioned coaxially therein.

4. The terminal-cover assembly of claim 1 wherein said cover hole has at least one flat formed therein and an end portion of said terminal is adapted for threaded connection to an electrical bus-bar, so that when torque is applied during connection of said terminal to said bus-bar said terminal will not turn relative to said cover.

5. The terminal-cover assembly of claim 4 wherein said end of said terminal has a radially extended head portion, said head portion having at the periphery thereof a sharp rim projecting toward the plane of said cover into said bushing.

6. The terminal-cover assembly of claim 1 wherein said resilient material is tetrafluoroethylene.

7. The terminal-cover assembly of claim 6 additionally comprising an electrolytic type capacitor body, an electrolyte and a metal can having an open mouth, said electrolyte and said body being enclosed within said can, said cover being sealed to said mouth of said can.

8. The terminal-cover assembly of claim 7 wherein said electrolyte is dimethylformamide.

* * * * *